Figure 1:
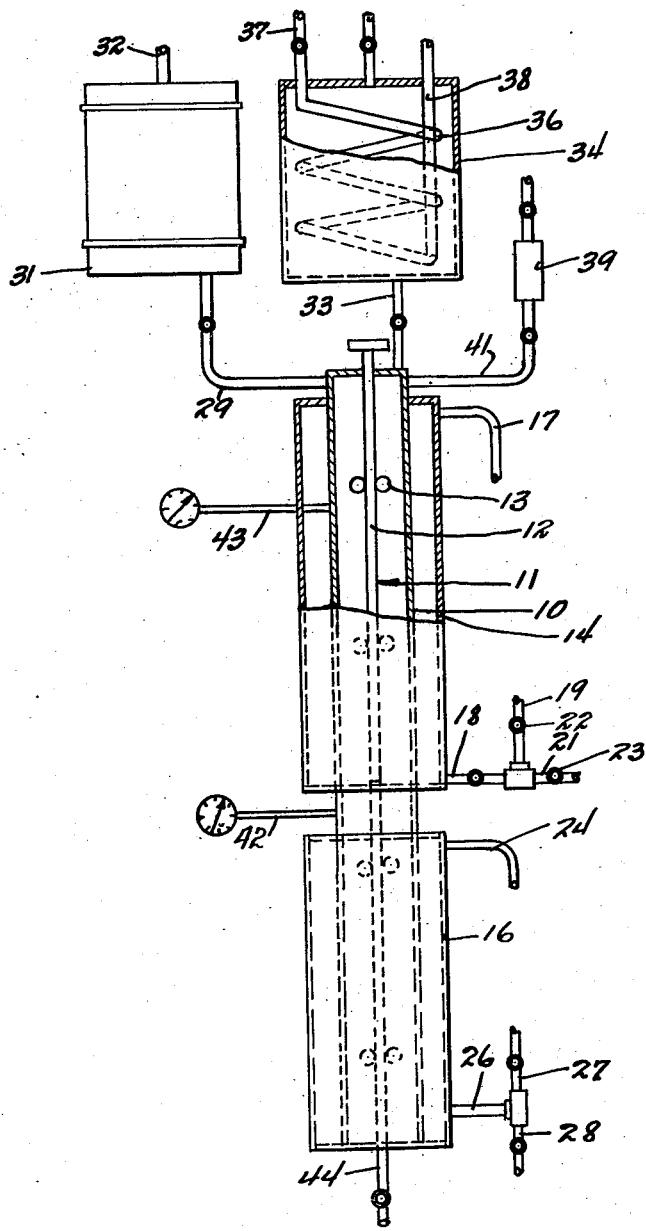

April 2, 1946.  H. L. GERHART  2,397,600
RESINOUS MATERIAL

Original Filed March 16, 1940   2 Sheets-Sheet 1

Inventor
HOWARD L. GERHART

By Olen E. Bee
Attorney

April 2, 1946. H. L. GERHART 2,397,600
RESINOUS MATERIAL
Original Filed March 16, 1940 2 Sheets-Sheet 2

Inventor
HOWARD L. GERHART
By Olew E. Bie
Attorney

Patented Apr. 2, 1946

2,397,600

UNITED STATES PATENT OFFICE 2,397,600

RESINOUS MATERIAL

Howard L. Gerhart, Milwaukee, Wis., assignor to Pittsburgh Plate Glass Company, Allegheny County, Pa., a corporation of Pennsylvania Original application March 16, 1940, Serial No. 324,392. Divided and this application September 17, 1943, Serial No. 502,727

8 Claims. (Cl. 260—23)

The present invention relates to the artificial resins, and it has particular relation to the manufacture of artificial resins from diene hydrocarbons.

One object of the invention is to provide a resin which is inexpensive to prepare, readily soluble in cheap hydrocarbon solvents to provide varnishes that upon application to wood, metal, or other surfaces, readily dry in the air and, subsequently, quickly harden to firm, strongly adherent films which are inert in alcohol and other solvents, and are relatively chemically inert with respect to food products, and similar materials.

Cyclopentadiene mixed with dicyclopentadiene occurs in considerable proportion in drip oils and other fractions in certain of the products obtained in the cracking of petroleum hydrocarbons, in the production of carbureted water gas, and in the refining of coal tars. The cyclopentadiene and dicyclopentadiene can be obtained in relatively pure form from these sources by distillation. The mixture of monomer and dimer as thus obtained, has heretofore been subjected to heating in order to pyrogenetically decompose the dimer to form the monomer. It has been suggested to treat the resultant cyclopentadiene with a catalyst such as the halide of an amphoteric metal in order to induce at a low temperature a peculiar type of reaction in which hydrocarbon molecules are linked together in complex chains, in which the molecules of the catalyst act as connecting links. When the reaction product is treated with alcohol, a polymer of the hydrocarbon is split off. The resultant polymer has been described as a rubber-like product which is insoluble in hydrocarbon solvents, and which upon exposure to the atmosphere, eventually degrades into a powder-like material. It has been suggested to work this powdery material up with suitable plasticizers or softeners in order to form a composition suitable for use as lacquers. However, insofar as at present is known, such process has never received any commercial application. The rubbery masses as heretofore initially obtained by treating cyclopentadiene with a catalyst, since they are insoluble, are quite unsuitable for use as lacquer forming constituents.

The present invention is based upon the discovery that by proper control of certain of the conditions involved in the production of polymers of cyclopentadiene hydrocarbons, it is possible to produce resin-like bodies which are new chemical entities and are in contrast to known materials. For example, they do not require the use of alcohol to effect formation of a polymer. They do not resemble rubber. They are relatively soluble in practically all of the ordinary hydrocarbon solvents, and upon exposure to the atmosphere, do not decompose or degenerate into powders. Films of the resin do not degenerate but instead maintain their continuity although they oxidize to hard, adherent state. Accordingly, the resins are suited for use as film-forming ingredients in lacquers and varnishes and for many other uses, e. g., for molding, casting, as adhesives and the like.

As above stated, dicyclopentadiene, from which cyclopentadiene is readily derived, is obtained mainly from three sources, namely, from the cracking of petroleum hydrocarbons, from domestic gas production, and lastly from the coal tar industry. The material has heretofore been of little or no commercial value, and has in most cases not been separated from the fractions containing it. The laboratory method of obtaining cyclopentadiene from dicyclopentadiene has heretofore involved heating in a flask, and separating the monomer by distillation. The method, however, is relatively inefficient and only low yields of the cyclopentadiene can be obtained by the application thereof.

A method has now been developed, whereby dicyclopentadiene fractions, as obtained from the above-designated industries, can be converted in almost quantitative yields into cyclopentadiene suitable for conversion into highly useful resins in accordance with the provision of the present invention. The method involves as one feature admixing dicyclopentadiene fractions with paraffin oil having a boiling point which is above that of dicyclopentadiene, and distilling off from the resultant solution a mixture of dicyclopentadiene and cyclopentadiene vapors which are subsequently passed through a heated tube in order further to decompose the dicyclopentadiene into cyclopentadiene. Then the dicyclopentadiene which is not decomposed into cyclopentadiene is condensed and returned to the distillation flask. The cyclopentadiene of course is of relatively low boiling point, and can easily be separated from the dicyclopentadiene material.

Cyclopentadiene is subjected to polymerization in accordance with the following procedure: Cyclopentadiene is dissolved in a hydrocarbon solvent such as gasolene or benzene or other solvents to provide a solution containing from 40% to 70% (more or less) of solvents. This solution is then warmed up at least to room temperature, or perhaps roughly to a temperature of 30° to 60° C. and preferably to 40 to 50° C., and a suitable catalyst is added in an appropriate amount. Various catalysts may be employed, among which may be included halides of amphoteric metals. These include tin tetrachloride, or bromide, or iodide, and the like. Chlorides of antimony, bismuth and aluminum, as well as boron fluoride and dihydroxy fluoboric acid are also applicable. Addition complexes of these compounds with organic polar compounds such as $BF_3+(C_2H_5)_2O$, $FeCl_3+(C_2H_5)_2O$, $BF_3CH_3COOH$ are also useful.

It has been found that as a catalyst, dihydroxy fluoboric acid also has outstanding advantages for preparing polycyclo from cyclopentadiene. Its use may be described as follows:

To a solution consisting of a mixture of 1 part by weight of cyclopentadiene and one part by volume of an inert hydrocarbon such as benzol, toluol, petroleum, hydrogenated petroleum or chlorinated hydrocarbons, is added no more than $1/50$ part by volume of dihydroxyfluoboric acid at 35° C. The solution is stirred to produce intimate mixture of the catalyst and cyclopentadiene. After about 3 to 5 minutes, the temperature will rise to 50 then to 60 and perhaps to 80° C. If cooling is provided, the temperature may not rise above 50° C. The liquid will thicken as the polycyclopentadiene forms and will assume a dark brown, cloudy appearance. If the amount of catalyst used is not excessive, about 50 to 70 per cent of the theoretical amount of resin will be formed. If the cooling means is very efficient, the temperature may not rise above 50° C. and the amount of resin formed is decreased. After the cooling means is removed, the temperature will rise from 50° to as high as 80° C. if permitted, or it may be caused to do so rapidly by adding more catalyst and mixing.

An infinite number of temperature conditions and catalyst concentrations can be used in the reaction but in general it is desirable to keep the first peak of the temperature rise at 50–60° C. so as to prevent a profuse boiling of the cyclopentadiene. This is accomplished by cooling. On the second temperature rise, which starts after the cooling bath is removed or when more catalyst is added, the peak may go as high as 120° C. but it is preferred to limit it to 80° C. by cooling. This latter temperature rise is desirable, however, and it is preferred to heat the resin solution after the polymerization is substantially complete to effect a final "cure."

The new catalyst has the following advantages:
1. It does not react below 30° C. for the above concentration of cyclopentadiene used, thus permitting an easy control since merely cooling the solution sufficiently will inhibit the reaction.
2. The amount of catalyst required is less than that required in the case of the catalysts used heretofore.
3. The resin is very much lighter in color. This is a very important advantage. Solutions of the resin air-dry and bake to give lighter films.
4. It is easier to purify the resin and remove the catalyst.
5. The catalyst is a liquid and does not cause polymerization of the gaseous cyclo above the reacting solution. In the case of stannic chloride, boron fluoride, and other catalysts which are normally gaseous, the gaseous polymerization is objectionable.
6. The action is certain, predictable, and reproducible in a plant.
7. The resin formed is free from poisonous impurities.

Ferric chloride admixed with a little hydrogen chloride is also of interest as a catalyst, because its use results in a resin of relatively light color.

This catalyst may be used as follows:

Example 1

To 400 grams cyclopentadiene and 600 c. c. of toluene was added 3 grams of solid ferric chloride. The mixture was stirred for 1 hour at an average temperature of 45° C. A light colored solid resin was precipitated from solution with methyl alcohol. Combinations of catalysts are also preferred. Thus, the combination of one mole of each of ferric chloride and silicon tetrachloride is more active than either component by itself.

Example 2

In a specific example of such combination, 300 grams of cyclopentadiene was stirred with 10 grams of solid ferric chloride at 25° C. There was no exothermic reaction for 10 minutes, but upon addition of ½ c. c. of silicon tetrachloride, the temperature rose to the boiling point and it was necessary to cool the reaction mixture.

The amount of catalyst employed in the reaction may vary over a considerable range, but preferably does not exceed about 1%, and seldom if ever should exceed 2% or 3%. Use of amounts greater than this result in the formation of excessive amounts of insoluble rubber-like products. Lower amounts of catalyst may be employed, but of course excessive reduction of the amount is likely to result in undue reduction of the speed of the reaction. Probably the amount should not be materially less than about one or two-tenths of one per cent. The reaction comes to an end usually within a period of about one-half to one hour. The color of the solutions may be improved by treating them with activated charcoal.

The resultant resin solution may be treated with alcohol, acetone, or the like to precipitate the resin. The solvent can also be removed by evaporation if desired. Treatment of the resin solution with alcohol or acetone results in the removal of all or most of the catalyst employed. The resultant resin may likewise be treated with a basic substance to precipitate or inactivate the catalyst and remove at least a part of the color of the resin solution at this point. Thus ammonia gas may be passed into the solution or organic bases such as morpholine, triamyl amine, diethyl amine, etc. may be added.

The product is resinous in character and of light color. It readily dissolves in hydrocarbons such as toluol or xylol, and petroleum or hydrogenated petroleum, which is in contradistinction to the resins which have heretofore been produced at lower temperatures, and which are quite insoluble in these materials. The resin does not degenerate or deteriorate into a powdery material upon exposure to the atmosphere.

Solutions of the resin in hydrocarbon solvents are of low viscosity and excellently adapted for spraying or for application by other methods. Solutions when applied as varnish films to surfaces of wood, metal, or the like, form uniform films which dry quickly, and which upon exposure to the atmosphere are soon oxidized to hard, highly adherent state. Oxidation and resultant hardening are promoted by subjecting bodies coated with the resin, to baking at a suitable temperature, e. g., about 200 to 300° F. Such baking, of course, tends to soften the resin during operation and thus promotes flow to provide highly smooth and uniform coatings.

The resins are highly adherent to sheet metal such as iron or steel, and when so applied show no reaction with the base metal. Therefore, they are excellently adapted for coating beer cans, and cans for foods of all types. They are also useful as coatings for pipe lines and containers for chemical products. Surfaces of iron may receive preliminary coatings of a phosphatic material such as zinc phosphate, in order to promote adherence and to obviate the possibility of rusting of the surfaces preliminary to application of the resin coating. Application of coatings of the new resins to metallic surfaces in order to provide priming films for the reception of coatings of other resins, such as the copolymer of vinyl acetate and vinyl chloride, or cellulosic material such as cellulose acetate, cellulose nitrate, acetyl cellulose, benzyl cellulose, and the like of course is permissible.

The resins may be incorporated with various plasticizers including amyl and diamyl naphthalene, dimethoxy tetraethylene glycol, triethylene glycol dihexoate and the like. However, the resins are of relatively flexible character, and in many cases require little or no plasticizer. The hardened resins may be formed by heat and pressure into rods, sheets and other forms. They may also be admixed with fillers and pressed in the same manner as phenolic resins.

It has been found that it is not possible to mechanically combine at ordinary temperatures a vegetable or animal glyceride such as soya bean oil, linseed oil, fish oil or China-wood oil with the resins herein described. However, when the glyceride is made a part of the charge, i. e., when the cyclopentadiene is polymerized in the presence of the glyceride, the said glyceride will become chemically united with and will become a part of the resinous composition. Such a resin composition possesses greater flexibility than one made from unmodified cyclopentadiene. Instead of a glyceride, the free acid hydrolysis products of glycerides may be used. Thus it is possible to substitute soya acids for soya bean oil, linseed acids for linseed oil, etc.

Examples of various charges which can be used are:

*Example 3*

| | Cubic centimeters |
|---|---|
| Cyclopentadiene | 4210 |
| Xylol | 3050 |

Any unsaturated vegetable oil can be used; also any product in which a vegetable oil is present in some degree or combination such as in the alkyd resins or varnishes. The following charges illustrate some of the mixtures which were polymerized with stannic chloride or dihydroxyfluoboric acid or boron fluoride-ethyl ether complex at 50° C. average reaction temperature:

*Example 4*

| | | |
|---|---|---|
| Cyclopentadiene | grams | 60.5 |
| Xylol | cc | 61 |
| Linseed or soya bean oil | cc | 90 |

*Example 5*

| | | |
|---|---|---|
| Cyclopentadiene | grams | 50 |
| Xylol | cc | 65 |
| Perilla oil, China-wood oil or oiticica oil | cc | 5 |

*Example 6*

| | | |
|---|---|---|
| Cyclopentadiene | grams | 20 |
| Soy oil | cc | 100 |

The product of this reaction is compatible with vegetable oils.

*Example 7*

| | | |
|---|---|---|
| Cyclopentadiene | grams | 50 |
| Linseed acids or cottonseed oil acids | cc | 5 |
| Xylol | cc | 65 |

*Example 8*

| | | |
|---|---|---|
| Linseed, ester gum varnish | cc | 50 |
| Cyclopentadiene | grams | 50 |
| Xylol | cc | 10 |

The varnish comprises 12½% ester gum, 35½% oil and 52% thinner.

*Example 9*

| | Cubic centimeters |
|---|---|
| Cyclopentadiene | 3850 |
| Soya bean oil | 475 |
| Xylol | 2875 |

*Example 10*

| | Cubic centimeters |
|---|---|
| Cyclopentadiene | 3400 |
| Corn oil or cottonseed oil | 450 |
| Xylol | 2600 |

It is possible to prepare a co-polymer of cyclopentadiene and the vegetable oil molecule or a polymer of cyclopentadiene which includes the vegetable oil molecule using any ratio of vegetable oil to cyclopentadiene. Bodied oils or mixtures of bodied oils are useful. The following are examples in which bodied oils were used:

*Example 11*

| | Cubic centimeters |
|---|---|
| Cyclopentadiene | 2280 |
| Tung oil } Bodied together for | 1853 |
| Linseed oil } 1¾ hours at 540° F. | 3706 |

This mixture was polymerized with 70 grams BF₃ (C₂H₅)₂O.

*Example 12*

| | Cubic centimeters |
|---|---|
| Cyclopentadiene | 4170 |
| Soya oil | 2835 |

This mixture was polymerized with BF₃ (C₂H₅)₂O.

Other types of oils may be polymerized with cyclopentadiene. An example of such is as follows:

| | Cubic centimeters |
|---|---|
| Cyclopentadiene | 150 |
| Dehydrated castor oil | 50 |

The mixture was polymerized with dihydroxy fluoboric acid as a catalyst.

Cyclohexadiene may be substituted for cyclopentadiene and conjointly polymerized with vegetable oils as above described in connection with cyclopentadiene.

Cyclohexadiene may also be polymerized by itself in the same manner as cyclopentadiene. Such polymers are compatible with resin or oil, such as linseed or other oil, depending upon which predominates and oils may be used interchangeably. This procedure affords a new means of incorporating hydrocarbons with vegetable oils. It may be possible to use these oil resins to prepare varnishes in the usual manner by heating with gums and more oil. The oils impart flexibility to the resin.

Valuable resins may be prepared by heating the dicyclo and glyceride in a closed system at above 200° C. and preferably at 230 to 260° C. for from one to ten hours, preferably about two hours.

The following charges are representative of useful mixtures from which these resins were prepared:

|     | | Cubic centimeters |
| --- | --- | --- |
| (1) | Linseed oil or soya oil | 500 |
|     | Dicyclopentadiene | 1500 |
| (2) | Tung oil | 500 |
|     | Dicyclopentadiene | 1500 |
| (3) | Tung oil | 1000 |
|     | Dicyclopentadiene | 1000 |
| (4) | Tung oil | 1000 |
|     | Linseed oil | 300 |
|     | Dicyclopentadiene | 1000 |
| (5) | Tung oil | 1000 |
|     | Perilla oil | 500 |
|     | Linseed oil | 500 |
|     | Dicyclopentadiene | 1000 |

A charge containing relatively large amounts of tung oil requires less time and lower temperatures than a charge containing soya or linseed oils. When the ratio of tung oil to dicyclo is greater than 1 to 1, there is danger of forming an insoluble gel. This danger is not apparent when there is present some oil such as linseed or soya oil in which case the ratio of tung oil to dicyclo may be raised at will. Oils may be raw, bodied, blown, refined, dehydrated, etc.; in general, all natural or treated glycerides are useful. Oil acids or partially hydrolyzed oils are also useful. The reaction time must be predetermined and is governed by the rate of bodying of the oil and the body desired in the finished resin.

The heating may be carried out in any convenient manner such as heating in a glass or steel reaction bomb or autoclave. A preferred method consists in pumping the reacting mass through heated coils from an insulated tank which contains the bulk of the charge. The finished viscous resin may be withdrawn while hot and thinned with the desired solvent.

This process has the advantage of a one-step process and produces a resin having good light stability, toughness, light color on baking, and short drying time. The resins are soluble in the common cheaper hydrocarbon thinners, are well adapted as varnishes or as enamel vehicles, and can be applied in the same manner as existing varnishes. They are responsive to the addition of driers in the same manner as a varnish.

Useful pigmented compositions are made as shown by the following examples:

| Resin composition | Heating schedule | Pigment composition |
| --- | --- | --- |
| (a) 1300 cc. tung oil 500 cc. bodied soya oil 1000 cc. dicyclopentadiene. | 2 hr./245° C | Calcium base Titanium oxide |

(These two enamels dry to give tough white coatings having good light stability.)

| (b) 1000 cc. tung oil 300 cc. linseed oil 1000 cc. dicyclopentadiene. | 2.5 hrs./250° C | 1 part antimony oxide 1 part Titanox C ⅓₂₅ part carbon black |

This gray enamel can be used for both air-drying and baking types of finishes. The use of these resins is not limited to any particular type of pigment. The resins can be used as vehicles for aluminum, zinc paints, gilsonite, lithopone, etc. Driers may be added either to the charge and be processed with the resin or may be incorporated with the finished vehicle or enamel paste. Certain metallic soaps such as cobalt, nickel, zinc or copper naphthenates, or the salts of the acids derived from natural glycerides are useful as addenda to the charge to increase the body of the resin. These salts then act as driers when the films are subjected to drying conditions.

When pure dicyclopentadiene is the only hydrocarbon in the charge, the resin will usually be a semi-plastic mass which must be thinned for use. This is preferably done while the resin is hot. Any hydrocarbon thinner is useful for this purpose. The charge may contain diluting materials which are normally present in commercial dicyclopentadiene such as indene and coumarone, which are useful modifying agents for resins of this class. The most useful resins are formed, however, when at least 50 per cent of the hydrocarbon charge comprises dicyclopentadiene. Other non-resinifying diluents are permissible or these may be added during any stage of the resinification reaction to reduce the viscosity.

The method of forming solutions of glyceride oils and cyclopentadiene by employing a vegetable or similar glyceride oil as an absorption medium for cyclopentadiene generated by cracking dicyclopentadiene is referred to in my companion case, Preparation of cyclopentadiene from dicyclopentadiene, filed March 16, 1940, Serial No. 324,391.

It is to be understood that any of the oils or free fatty acids of oils herein mentioned may be employed as absorption media in the process disclosed in the companion case, and the oil, when adequately saturated, may be subjected to polymerization as herein described.

Absorption of cyclopentadiene in the cracking process may also be halted before completion and a quantity of cyclopentadiene may be added to obtain desired proportions. Subsequently, this solution is polymerized.

Figures 2, 3:
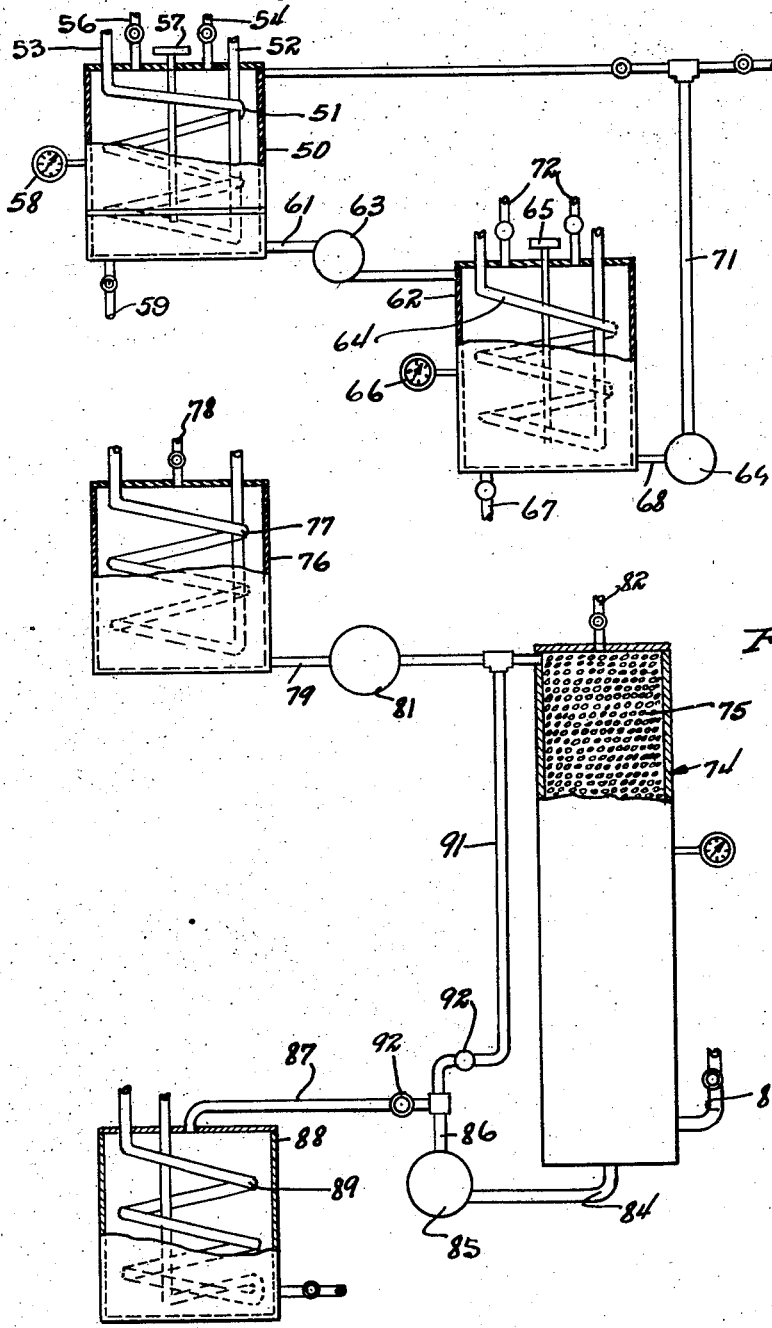

Suitable embodiments of apparatus for conducting the polymerization of cyclopentadiene on a commercial scale are disclosed in the drawings in which Figures 1, 2, and 3 are diagrammatical views illustrating three different forms which the apparatus may take.

In the apparatus disclosed in Figure 1 a reaction chamber 10 of column-like form is provided with an agitator 11 including a shaft 12 carrying agitator blades 13 and projecting at its upper extremity through a suitable packing (not shown) in the top of the reaction chamber, for connection to any convenient drive mechanism (not shown). The column is enclosed by a jacket including upper section 14 and lower section 16. The former section is provided at its upper extremity with an outlet 17 for a temperature regulating fluid which may be admitted at the bottom of the section by means of a conduit 18 having branches 19 and 21, leading respectively to sources of heating and cooling medium. Valves 22 and 23 in the branches provide means for controlling the admission of the heat-controlling fluid.

Similarly, section 16 of the jacket is provided with an outlet 24 and an inlet 26 for fluid, the inlet being branched as indicated at 27 and 28 to admit of quick change from hot to cold fluid as may be required.

Cyclopentadiene, in a solvent such as toluene, is fed to the top of the reaction column 10 by means of conduit 29 leading to storage tank 31, having an inlet 32 by means of which the supply of cyclopentadiene may be replenished from time to time. Reaction chamber 10 is also provided at its upper extremity with conduit 33 leading to an expansion chamber 34 within which is disposed a cooling coil 36 having inlet 37 and outlet 38. Catalyst for the reaction is stored in a chamber 39 connected by means of conduit 41 to the top of the reaction chamber.

Thermometers 42 and 43 are connected to the reaction chamber in such manner as to admit of observation of the temperature within the latter. An outlet conduit 44 at the bottom of the reaction chamber provides means for withdrawing the polymerized product continuously or from time to time as may be desired.

In the operation of the apparatus cyclopentadiene or any one of the mixtures of cyclopentadiene and solvent or reactive glyceride oil herein disclosed from storage chamber 31 is admitted to reaction chamber 10 while the upper section of the latter is cooled and the lower section is simply heated in order to bring the cyclopentadiene to reaction temperature. Catalyst is also admitted from the chamber 39 in an appropriate amount and the agitator 11 is actuated in order thoroughly to admix the catalyst with the charge. Reaction in the lower portion of the chamber 10 is indicated by rise of the temperature and when the latter reaches approximately 40° C. it is maintained that the latter value by admission of cooling fluid through the section 10 of the jacket. If preferred to speed up the reaction, a solution of cyclopentadiene of greater than 40% concentration may be fed to the reaction chamber and the temperature allowed to rise to about 60° C. In the latter case there will be substantial ebullition throughout the reaction mixture and it rises into the expansion chamber 34 where it is cooled by the coil 36. It will be apparent that in event the ebullition is not too violent the vapors merely pass upwardly into the expansion chamber and the latter acts as a reflux condenser.

When the reaction with the chamber 10 has passed its peak, both sections of the jacket may be heated in order to effect a cure of the fluid resin contained therein. During this curing stage additional catalysts may be added.

In the apparatus shown in the Figure 2 an initial reaction chamber 50 is provided with cooling coil 51 having inlet 52 and outlet 53 for heating fluid. Catalyst is admitted to the chamber through inlet 54 and cyclopentadiene to be polymerized is admitted through conduit 56. The two materials are admixed within the chamber by means of agitator 57. The temperature fluctuations in the chamber are determined by means of a thermometer 58. The reactants within the chamber may be drawn off if desired through conduit 59, but preferably are flowed off through conduit 61 to a second reaction chamber 62. This flow may be by gravity or may be assisted by means of a suitable pump 63. Reaction chamber 62 is cooled by means of a coil 64 through which an appropriate cooling medium is circulated. An agitator 65 is also provided. The course of the reaction within the chamber is determined by observation of thermometer 66 which is connected to the chamber in conventional manner. The reaction product from the chamber 62 may be withdrawn to storage through conduit 67 or it may be recycled through conduit 68, pump 69 and conduit 71 to the initial reaction chamber 50. In the latter, additional catalysts may be added and the resin subjected to heat in order to effect a final cure. The finished product is withdrawn through the conduit 59. Catalyst may be added through conduits 72.

The mode of operation of the apparatus is substantially self-evident. The reactants are simply introduced into chamber 50, heated to a temperature of about 40 to 60° C. until reaction has progressed sufficiently far to induce exothermic temperature rise. The mixture of catalysts and resin is then withdrawn to chamber 62 where the temperature is maintained at the desired value until the peak of the reaction has passed, as evidenced by the tendency of the reactants to cool. Subsequently the materials are recycled to chamber 50 where additional catalyst is added and the material heated in order to effect a final cure.

In the form of the apparatus disclosed in Figure 3, the catalyst and the cyclopentadiene are admixed cold and the cold mixture is employed in such manner as to obtain regulation of the temperature in the reaction chamber. The apparatus embodies a suitable reaction column 74 which may be packed with carbon rings, steel chips, or similar packing materials 75. The charge for the column is contained in chamber 76 which is provided with a cooling coil 77, and an inlet 78 for replenishment of the charge. The cyclopentadiene after cooling is admitted through conduit 79 and pump 81 to the top of the reaction column. The column is supplied with catalysts through conduit 82. Inlet conduit 83 at the bottom of the column 74 provides means for admission of additional catalyst. Partial polymerized cyclopentadiene after the reaction has passed its peak may be withdrawn from the chamber 74 through conduit 84 at the bottom thereof and fed by pump 85 through conduits 86 and 87 to a curing chamber 88, which is suitably heated by coil 89 through which fluid is conducted, or if preferred it may be recycled by the pump through extension 91 of conduit 86 to the top of column 74. Valves 92 provide means for determining the course of flow of the reactants.

In the operation of this embodiment of the apparatus, cold cyclopentadiene is introduced at the top of column 74 where it is admixed with catalysts that flows downwardly through the packing 75. In the bottom of the chamber the mixture of cyclopentadiene, in the presence of the catalyst, reacts exothermically and as the reaction temperature tends to rise, cold charges is introduced from the storage tank. This cools the reacting liquids and checks the violence of the reaction. When the charge in the bottom of the column is approximately 75% polymerized, additional catalyst is added through conduit 83 and the mixture withdrawn through conduit 84. The partially reacted resin may optionally be recycled through conduit 91 to the top of the chamber 75 or through conduit 87 to chamber 88. In the latter it is subjected to a curing temperature by circulation of heating fluid through coil 89.

This is a division of my copending application Serial No. 324,392, filed March 16, 1940, for Resinous material.

Although certain forms of the invention have been described herein, it will be apparent that these are merely exemplary, and that numerous modifications may be made therein without departure from the spirit of the invention, or the scope of the appended claims.

What I claim is:

1. A process of preparing a resinous material which comprises heating a mixture of dicyclopentadiene and an unsaturated glyceride oil to a temperature of about 200 to 260° C. for a period of about 1 to 10 hours while the material is in a closed container.

2. A process of preparing a resinous material which comprises heating a mixture of an unsaturated glyceride oil and dicyclopentadiene in a closed container and in the absence of catalysts of polymerization to a temperature of about 200° to 260° C. until a copolymer soluble in hydrocarbon thinners is formed.

3. A process of preparing a resinous material which comprises heating a mixture of dicyclopentadiene and an unsaturated glyceride oil to a temperature above about 200° C. in the absence of catalysts of polymerization and in a closed container until a conjoint polymer of the components of the mixture soluble in hydrocarbon thinners is formed.

4. A process of preparing a resinous material which comprises heating a mixture of dicyclopentadiene and a drying glyceride oil to a temperature above about 200° C. in the absence of catalysts of polymerization and in a closed container until a copolymer soluble in hydrocarbon thinners is formed.

5. A process of preparing a resinous material which comprises heating a mixture of dicyclopentadiene and linseed oil to a temperature above about 200° C. in a closed container and in the absence of catalysts of polymerization until a conjoint polymer soluble in hydrocarbon thinners is formed.

6. A process of preparing a resinous material which comprises heating a mixture of dicyclopentadiene and tung oil in a closed container and in the absence of catalysts of polymerization to a temperature above 200° C. until a conjoint polymer soluble in hydrocarbon thinners is formed.

7. A process of preparing a resinous material which comprises subjecting a mixture of dicyclopentadiene and soya bean oil to conjoint polymerization by heating said mixture in a closed container in the absence of catalysts of polymerization to a temperature above about 200° C. until a resinous product soluble in hydrocarbon thinners is formed.

8. A process of preparing a resinous material which comprises subjecting a mixture of dicyclopentadiene and tung oil to conjoint polymerization by heating them in a closed container and in the absence of catalysts of polymerization to a temperature approximately within the range of 200° to 260° C. for a period of about 1 to 10 hours until a copolymer soluble in hydrocarbon thinners is formed.

HOWARD L. GERHART.